UNITED STATES PATENT OFFICE.

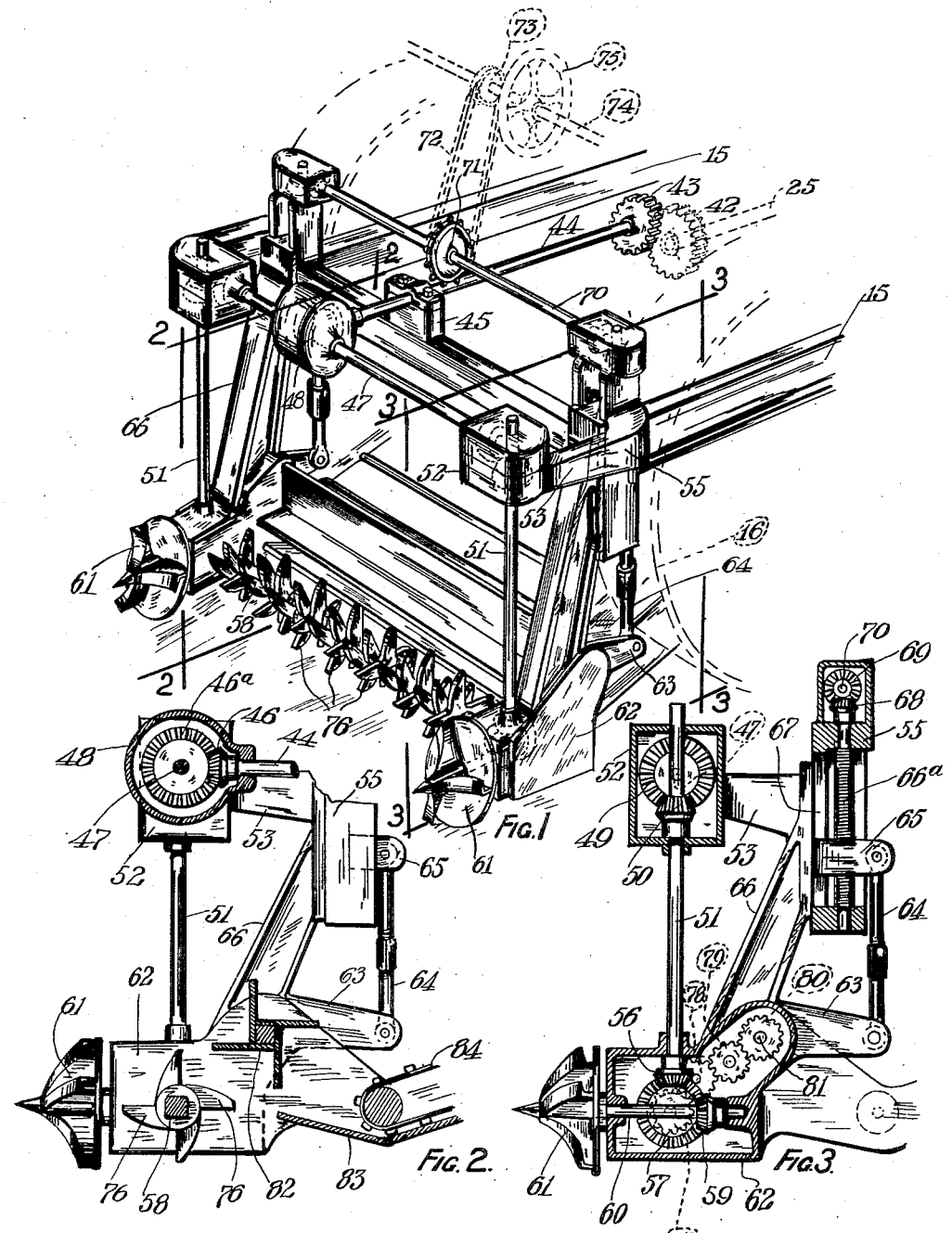

HENRY RAWES WHITTELL, OF SYDNEY, NEW SOUTH WALES, AUSTRALIA.

EARTH-EXCAVATING MACHINE.

1,182,067. Specification of Letters Patent. Patented May 9, 1916.

Application filed July 20, 1914. Serial No. 851,955.

*To all whom it may concern:*

Be it known that I, HENRY RAWES WHITTELL, a subject of the King of Great Britain and Ireland, residing at St. James Chambers, King street, Sydney, in the State of New South Wales, in the Commonwealth of Australia, draftsman, have invented certain new and useful Improvements in and Relating to Earth-Excavating Machines, of which the following is a specification.

The present invention relates to machines for the excavation of earth of a loose friable nature as sand, clay or gravel, and the removal of same rearwardly of the cutting or boring devices, and specifically to machines of the type carrying the cutting devices at the forward end and having a contained motive agent as an oil engine and the like, and gearing mechanisms for effecting the operative functions.

This invention has been devised to provide improvements in machines of the type specified with the object of embodying with compactness and novelty of design means for effectively removing the excavated material, and means for raising the cutting tools clear of the ground during the traction of the machine to and from the field of operations.

A further object of the invention is the elimination of a fore-carriage carrying the excavating tools and attached to the main body or chassis of the machine.

A specific object of the invention is the provision of an excavator having superior practical value over known machines of the type specified. In carrying out the invention the plurality of excavating tools comprise a transverse series of cutters rotating toward the work, the series terminating at each end in a cutter rotating at right angles to and toward the said series or transversely to the machine. The cutting tools are supported at the lower end of a vertical framing adjustable vertically within a bracket fitment directly attached to the forward end of the chassis of the machine.

Disposed rearwardly and slightly above the transverse series of cutters and parallel thereto is provided a conveyer or beater drum operating to feed the excavated material rearwardly to the forward end of an endless conveyer of the bucket or scraper type elevating the material by direct upward lift to the rear of the machine.

The rotation of the cutters is effected by means of an engine mounted on the chassis with shafting gears from which power is transmitted to vertical shafting passing down before mentioned bracket for gearing with the shafting of the cutting tools.

Other objects will become more apparent by reference to the drawings, the specification and the claims, forming part of the specification.

Figure 1 is a perspective view of the forward end of the machine. Fig. 2 is a section on line 2—2 of Fig. 1. Fig. 3 is a section on line 3—3 of Fig. 1.

The main framing or chassis consists of longitudinal bearers 15 held apart by cross bearers conveniently disposed, the whole being supported forwardly on driving wheels 16 and rearwardly on steering wheels, not shown in the drawing. In the drawing only such parts of the machine are indicated which are essential for a clear understanding of its operation.

An engine, not illustrated in the drawing, is suitably mounted on the main framing, and the engine main shaft 25 carries on its forward end a pinion 42 meshing with a pinion 43 of the main cutter driving shaft 44, suitably supported in a bearing 45 provided on the main framing. The driving shaft 44 terminates forwardly in a bevel pinion 46 gearing with a pinion 46$^a$ on the transverse shaft 47, said bevel pinions being housed in a casing 48. The transverse shaft 47 has a terminal bevel pinion 49 at each end gearing with a similar pinion 50 feathered on the vertical shafts 51. The pinions 49 and 50 are housed in casings 52 carried by the brackets 53 secured to the brackets 55, fixedly attached to the forward end of the longitudinal bearers 15 of the chassis of the machine.

The top ends of the vertical shafts 51 pass freely through the casings 52, while the lower ends have terminal miter wheels 56 meshing with similar wheels 57 on the ends of the transverse cutter shaft 58, which latter wheels 57 also mesh with miter pinions 59 on the spindles 60 carrying the boring tools or trimmers 61 (see Fig. 3).

The miter pinions 56, 57 and 59 are housed in the casings 62 from each of which rearwardly projects a bifurcated bracket 63 to which the lower ends of the rods 64 are attached. The upper ends of said rods are connected to vertically traveling nuts 65 on worm shafts 60ª (see Fig. 3).

The traveling nuts 65 are integral with or attached to the slider plates 66 connected at the lower ends to the casings 62 and slidable vertically in the guide tracks 67 formed in the fixed brackets 55.

The worm shafts 66ª having bearings in said brackets 55 terminate at the top end in miter pinions 68 meshing with similar pinions 69 on the ends of the transverse shaft 70 having a central sprocket wheel 71 connected by chain gear 72 to a sprocket 73 on a shaft 74 mounted transversely and having hand wheel 75. This hand wheel 75 is arranged to be within easy reach of the operator so that the adjusting of the diggers and boring tools may be conveniently accomplished.

The cutter shaft 58 being provided with a plurality of star shaped cutting disks or diggers 76 is mounted near each end and within the casings 62, a spur wheel 77 (Fig. 3) gearing through spur wheels 78 and 79 with spur wheels 80 mounted at each end of a shaft 81 of the beater drum 82, said drum being positioned parallel and slightly above and rearwardly of the diggers 76 for the purpose of feeding the earth dug up by the latter to the tray or bed 83 of an endless scraper conveyer or elevator 84. The tray 83 may be supported in any convenient manner from the longitudinal bearers 15, while the endless conveyer extends rearwardly to a point where delivery is effected. The provision of the tray and the conveyer in itself do not form part of the invention.

The rotary earth cutters or diggers 76 are driven through the pinions and vertical shafts before described, which gear with transverse shaft 47 gearing with the main cutter driving shaft 44 which is driven from the engine shaft 25 by means of the pinions 42 and 43. The borers 61 are rotated by the spindles 60 of same gearing with the shaft 58, as before described, and the beater drum 82 by pinion 77 on shaft 58 gearing through pinions 78 and 79 with pinions 80 mounted on the shaft 81 of said drum.

The depth of cut or tilt of the diggers 76 and boring tools 61 is regulated by manual rotation of the worm shaft 66ª through shaft 70 coupled with the shaft 74 having the hand wheel 75, as hereinbefore described. This mechanism is also coupled when the excavating tools are to be lifted clear of the ground level during transit of the machine to or from the field of operations.

What I claim and desire to secure by Letters Patent is:—

1. In earth excavators, the combination of a series of rotary digging tools disposed transversely and forwardly of the machine, with a pair of boring tools disposed one at each end and at right angles to said series, said first and second named tools being mounted on brackets capable of being adjusted vertically.

2. In earth excavators, the combination of a series of rotary digging tools disposed transversely and forwardly of the machine, with a pair of boring tools disposed one at each end and at right angles to said series, the brackets carrying said first and second named tools and being capable of vertical adjustment, a transverse beater drum disposed rearwardly and slightly above said digging tools and an endless conveyer.

3. In earth excavators, the combination with a main engine shaft, of a transmission shaft, a driving shaft, said transmission shaft gearing with said engine shaft and said driving shaft, vertical shafts driven by said driving shaft, a transverse shaft actuated by said vertical shafts, a series of digging tools disposed on said transverse shaft, a pair of boring tools disposed one on each end and at right angles to said series and brackets carrying said first and second named tools and being capable of vertical adjustment.

4. In earth excavators, the combination of a transverse shaft with a series of rotary digging tools disposed one at each end and at right angles to said series, brackets comprising members secured to the forward end of the machine and having guide tracks, casings supporting said first and second named tools, extension plates integral with said casings and entering said guide tracks, and means for vertically adjusting said casings.

5. In earth excavators, the combination of a transverse shaft with a series of rotary digging tools disposed on said shaft, a pair of boring tools disposed one at each end and at right angles to said series, brackets secured to the forward end of the machine and having guide tracks, casings supporting said first and second named tools, extension plates integral with said casings and entering said guide tracks, threaded members provided on said plates, worm shafts projecting through said threaded members, means for rotating said worm shafts, a transverse beater drum disposed rearwardly and slightly above said digging tools and an endless conveyer.

6. In earth excavators, the combination with a main engine shaft, of a transmission shaft, a driving shaft, said transmission shaft gearing with said engine shaft and said driving shaft, vertical shafts driven by said driving shafts, a transverse shaft actuated by said vertical shafts, a series of digging tools disposed on said transverse shaft, a pair of boring tools disposed one at each end and at right angles to said series, brackets carrying said first and second named tools and being capable of vertical adjustment, a transverse beater drum disposed rearwardly and slightly above said digging tools and an endless conveyer.

Signed at Sydney, aforesaid, this first day of June, 1914.

HENRY RAWES WHITTELL.

Witnesses:
  WALTER SIGMOND,
  E. CUSH.